United States Patent [19]

Strutzel et al.

[11] 4,243,074
[45] Jan. 6, 1981

[54] TUBULAR PACKAGING MATERIAL, PREFERABLY FOR USE AS A SAUSAGE CASING

[75] Inventors: Hans Strutzel; Klaus Hoheisel; Siegfried Janocha, all of Wiesbaden, Fed. Rep. of Germany

[73] Assignee: Hoechst Aktiengesellschaft, Frankfurt am Main, Fed. Rep. of Germany

[21] Appl. No.: 910,144

[22] Filed: May 26, 1978

[30] Foreign Application Priority Data

May 28, 1977 [DE] Fed. Rep. of Germany ....... 2724252

[51] Int. Cl.³ .................... F16L 11/00; B65D 81/34; B32B 27/06
[52] U.S. Cl. ................................ 138/118.1; 426/105; 426/113; 426/127; 428/36; 428/474.7; 428/474.9; 428/910
[58] Field of Search .................. 138/118.1; 428/474.7, 428/474.9, 36, 910; 426/105, 106, 113, 127, 135, 412, 415

[56] References Cited

U.S. PATENT DOCUMENTS

| 3,093,255 | 6/1963 | Mesrobian et al. | 525/184 |
| 3,762,986 | 10/1973 | Bhuta et al. | 428/474.7 |
| 3,869,329 | 3/1975 | Schweitzer et al. | 428/474.9 |
| 3,932,692 | 1/1976 | Hirata et al. | 428/36 |
| 3,995,084 | 11/1976 | Berger et al. | 426/412 |

Primary Examiner—William R. Dixon, Jr.
Attorney, Agent, or Firm—Schwartz, Jeffery, Schwaab, Mack, Blumenthal & Koch

[57] ABSTRACT

Disclosed is a multi-layer tubular packaging material having two or more layers, comprising at least one first layer of a polymer comprising a linear polyamide and at least one second layer of a polymer comprising a linear polyamide containing from about 2 to 40 percent by weight of a hydrophilic substance compatible with the polyamide, e.g., polyvinyl alcohol.

21 Claims, 3 Drawing Figures

TUBULAR PACKAGING MATERIAL, PREFERABLY FOR USE AS A SAUSAGE CASING

The present invention relates to a tubular packaging material and more especially to a multi-layer tube based on polyamides, comprising at least two layers and having improved physical properties as compared to prior art multi-layer tubular films. The tube is ideally suited for packaging purposes, in particular, as a wrinkle-free sausage casing for sausages which are subsequently treated in hot water or steam.

From U.S. Pat. No. 3,762,986, multi-layer flat films are known which are based on various polyamides and are made up of structures according to the systems A/B/A, A/B, or B/A/B. In this case, the A layers represent polyamides having melting points below 200° C., e.g., polyamide 11 or polyamide 12, whereas the B layers represent polyamides having melting points above 200° C., e.g., polyamide 6, polyamide 6,6, or polyamide 6,10.

These composite films exhibit a low permeability to moisture, but their permeability to, e.g., oxygen is relatively high. The permeation values (in $cm^3/m^2.d.$ bar) for 40 $\mu m$ thick films range, e.g., for polyamide 12 from about 300 to 380 and for polyamide 11 from about 160 to 200. For many applications, this permeability to oxygen is still too high to prevent adverse effects on the goods packed due to oxidation. Problems may also be encountered concerning the adhesion values between the individual layers, as the films are produced by coextrusion.

U.S. Pat. No. 3,093,255 discloses the preparation of mixtures of polyamides (e.g., of polyamide 6 or polyamide 6,6) and polyethylene, which may, for example, be used for manufacturing films or for blow molding bottles. Although these products have a low permeability to gases, measurements have shown that the permeability to oxygen still exceeds 500 $cm^3/m^2.d.$ bar for 40 $\mu m$ thick films. As indicated above, these high permeability values cannot be tolerated in many applications. This United States patent does not mention the manufacture of composite films. It is only stated that the bottles produced may be coated with polyvinylidene chloride, thus reducing their permeability. However, such coatings must be regarded as critical for ecological reasons, since toxic vapors are generated when the shaped articles are destroyed in combustion plants.

In German Offenlegungsschrift No. 25 51 023 a polymer mixture is described which is composed of 60 to 90 parts by weight of polyamide, 40 to 10 parts by weight of polyethylene, and 1.8 to 8.0 parts by weight of a plastic graft copolymer. In this case, it is merely mentioned that mixtures of this kind may be used for the manufacture of wire insulations or shaped articles.

The journal "Kunststoffe", Volume 65, Number 3, pages 139 to 143, reports investigations conducted on plastic mixtures of polyamide 6 and high-pressure polyethylene, but it is not possible to infer from this report any suggestion for producing films or even composite films using these mixtures.

Many sausage casings are known which are made of thermoplastic films, of cellulose hydrate or of combinations of these materials with reinforcing or support materials, for example, paper or fabric. Sausage casings, however, must meet strict requirements, in particular relating to their physiological suitability, their strength during tying off and filling, their form stability during scalding, their softness during processing by hand, the wrinkle-free appearance of the finished sausages and low cost. None of the materials used for the manufacture of tubular films (e.g., polyethylene, polyester, the various polyamides, polyvinylidene chloride and polyvinyl acetate) possesses all of the properties required, without simultaneously exhibiting certain disadvantages. Polyethylene, e.g., is highly suitable for physiological reasons, it is soft in handling and extremely cheap; but it has the disadvantages of a low strength and an insufficient form stability.

One drawback of tubular films of many synthetic materials is that they tend to become wrinkled when the meat or sausage emulsion packed in these materials cools down. This is, above all, the case when the tubular films are used as casings for sausages which are, e.g., subjected to a sterilizing treatment by subsequently heating them. As is known, sausages which are to be treated in hot water or steam must be heated in a scalding kettle or in a cooking cabinet after filling. During this treatment, the volume of the sausage emulsion increases. As long as heat is supplied, the casing material has a temperature of 75° to 80° C. or above, and the sausage casing expands together with the sausage emulsion. As the sausages cool progressively from the outside to the center, the volume of the sausage emulsion decreases again; however, shrinking of the sausage casing is insufficient so that the casing only partially reassumes its original condition prior to heating. As a result, longitudinal creases are formed, which diminish the value of the sausages, as far as their appearance is concerned, because the consumer will associate the wrinkled condition with age. The reason for the formation of longitudinal creases is that the strength of the sausage casing at the scalding temperature, and thus its resistance to deformation, is only a fraction of its strength at 20° C. In addition, the sausages are abruptly cooled, for example, using cold water, after they have been treated at elevated temperatures.

In order to reduce the disadvantages of the prior art sausage casings, composite tubes have been proposed having inner layers which are composed of materials which are resistant to dilute acids and which are practically incapable of absorbing water. See German Offenlegungsschrift No. 23 58 560. The preferred materials mentioned are longer-chain polyamides, e.g., polyamide 11 or 12. The outer layers should consist of a polyamide, e.g., polyamide 6 or polyamide 6,6, or polyvinyl acetate, which have a comparatively high absorbing power for water. The comparatively high absorbing power for water of the outer layers is achieved by subjecting these layers to an acid treatment. For this purpose, inorganic and organic acids are used in dilute form, with hydrochloric acid being preferred.

Although these tubes lead to a certain improvement with respect to the wrinkle-free appearance of the sausages, as compared to prior art sausage casings, the acid treatment is, nevertheless, a disadvantage, since it may change the materials. In addition, it cannot be excluded that an acid residue remains in the tubes in spite of the washing procedures specified, and this is critical for physiological reasons. Furthermore, these tubes still do not have optimum values regarding their permeability to gases and vapors, in particular oxygen and water vapor, and also, an absolutely wrinkle-free appearance of the sausages, as desired by the customer, cannot be achieved.

SUMMARY OF THE INVENTION

It is, therefore, an object of the invention to provide a tubular packaging material which has improved barrier properties, in particular with respect to oxygen and water vapor, and which, in its preferred application as a sausage casing, encloses the sausage emulsion without forming wrinkles after the scalding process.

In accomplishing the foregoing objects, there has been provided in accordance with the present invention a multi-layer tubular packaging material having two or more layers, comprising at least one first layer of a polymer comprising a linear polyamide and at least one second layer of a polymer comprising a linear polyamide containing from about 2 to 40 percent by weight of a hydrophilic substance compatible with the polyamide. Preferably, the hydrophilic substance comprises polyvinyl alcohol which is obtained by 50 to 100 mol percent saponification of polyvinyl acetate and usually shows a degree of polymerization of 500 to 2000. The method for producing PVA is described, for example, in U.S. Pat. No. 3,440,316 and in U.S. Pat. No. 3,409,598, the disclosures of which are hereby incorporated by reference. Especially, a partially saponified PVA including less than 15 percent of unsaponified ester groups is used.

According to another preferred aspect, the polyamide containing the hydrophilic substance comprises a polyamide having from 4 to 6 carbon atoms in each unit, preferably polyamide 6. In one embodiment, the first polyamide layer is bonded to the inside of the second polyamide layer containing the hydrophilic substance and comprises a polyamide having 9 to 12 carbon atoms in each unit, preferably polyamide 11 or polyamide 12. In another embodiment, the first polyamide layer comprises a polymer blend of polyamide and polyethylene. In still another embodiment, the first polyamide layer comprises a polymer blend of polyamide and polypropylene, and in yet another it comprises a polymer blend of two polyamides and polyethylene. According to still another embodiment, the packaging material comprises at least one additional third layer of a thermoplastic polymer containing no polyamide, preferably a heat-sealable material.

Other objects, features and advantages of the present invention will become readily apparent from the detailed description of preferred embodiments which follows, when read in conjunction with the attached figures of drawing.

DETAILED DESCRIPTION OF PREFERRED EMBODIMENTS

Figure 1:
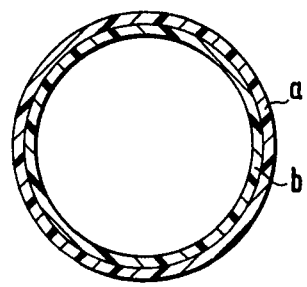
FIG. 1 is a cross-sectional view of a two-layer tubular film comprising the layers a and b, with the layer a being the polyamide layer containing the hydrophilic substance.
Figure 2:
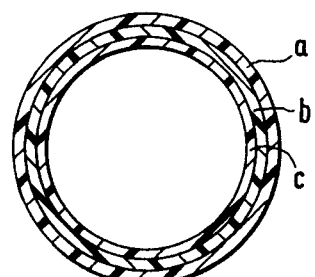
FIG. 2 is a cross-sectional view of a three-layer tubular film comprising the layers a, b and c, with the layer a being the polyamide layer containing the hydrophilic substance, and the layer c preferably being a heat sealing layer.
Figure 3:
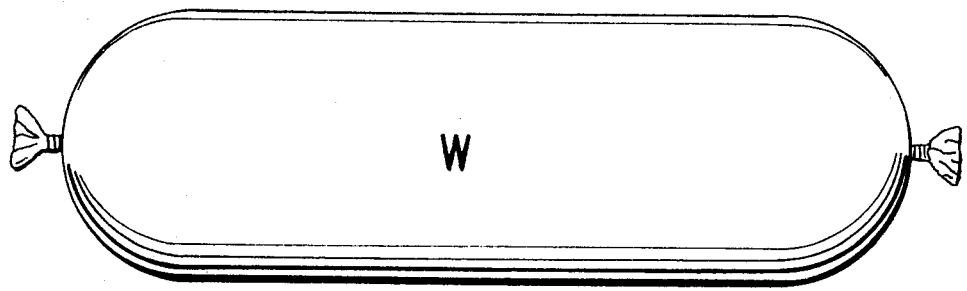
FIG. 3 is a side view of a sausage W prepared using a tubular film according to the invention, in the filled and tied state.

The present invention provides a tubular packaging material comprising at least two layers, with at least two of the layers being made up of linear polyamides. This tubular packaging material is characterized by the feature that at least one layer is composed of a linear polyamide containing 2 to 40, preferably 5 to 20 percent by weight of a hydrophilic substance compatible with the polyamide.

A considerable number of substances which are compatible with the polyamide may be employed, but it has been found that polyvinyl alcohol is especially suitable. In practice, polyvinyl alcohol in a partially saponified form containing less than 15 percent of unsaponified ester groups has proved particularly useful.

Although all usual types of polyamides may be used as the polyamides containing the hydrophilic substance, those containing 4 to 6 carbon atoms in each unit are preferred within the scope of the present invention. Of these, polyamide 6 is particularly preferred.

At a calculated thickness of 40 $\mu$m, the multi-layer tubular films preferably have a permeability value of <25, in particular <20 cm$^3$/m$^2$.d. bar for oxygen and <20 g/m$^2$.d for water vapor, respectively.

The polyamide layer which is bonded to the polyamide layer containing the hydrophilic substance is preferably composed of polyamides having 9 to 12 carbon atoms in each unit, with polyamide 11 or polyamide 12 being particularly useful. However, since the last-mentioned polyamides are relatively expensive, it is preferred, according to the present invention, to substitute these polyamides by polymer blends composed of polyamides and polyethylene. Suitable polymer blends are in particular those comprising 25 to 75, preferably 40 to 60 percent by weight of polyamide and 75 to 25, preferably 60 to 40 percent by weight of polyethylene. As far as the properties sought after are concerned, particularly good results are achieved when polymer blends of polyamide 6 and, preferably, a low-density polyethylene (high-pressure polyethylene) are used.

In order to obtain particular physical properties, for example, with a view toward ultimate tensile strength and/or suitability for printing and/or sealability, it is intended, within the scope of the invention, to apply additional layers, preferably composed of polyesters, polypropylene or sealing layers, for example, based on polyethylene.

The films are preferably used in a non-oriented form, but they may also be oriented in at least one direction to obtain particular physical properties, for example, an increased ultimate tensile strength. For this purpose, the known stretching methods are employed. The films may also be heat set to obtain a heat stable film, and this is also done according to known methods.

The multi-layer tubular films according to the invention are particularly suitable for use as sausage casings, where it is important to have a low permeability to oxygen and water vapor, and, in addition, a wrinkle-free enclosure for the sausage emulsion is desired.

The films may be produced according to known techniques, for example, by melt coating and other processes. Coextrusion is, however, preferred.

Below, the invention is more fully explained in detail by means of selected illustrative examples, however, without limiting it to the embodiments described therein.

EXAMPLE 1

A two-layer tubular film is prepared by coextrusion through an annular slot die. The inner layer has a thickness of 40 $\mu$m and is composed of a polynmer blend of 50 percent by weight of polyethylene having a density of 0.922 and 50 percent by weight of polyamide 6 having a viscosity of 255 ml/g and a melting range from 217 to 221° C. The outer layer has a thickness of 30 μm and is composed of a polymer blend of 85 percent by weight of the above polyamide 6 and 15 percent by weight of a polyvinyl alcohol having a viscosity of $1.8 \times 10^{-2}$ Pa.s and a degree of hydrolysis of 88 percent.

EXAMPLE 2

A two-layer tubular film is prepared by coextrusion using the polymer blends of Example 1, but in this case both layers have a thickness of 25 μm.

EXAMPLE 3

A two-layer tubular film is prepared by coextrusion. The inner layer has a thickness of 35 μm and is composed of a polymer blend of 60 percent by weight of polyethylene having a density of 0.918 and 40 percent by weight of polyamide 6 having a viscosity of 320 ml/g and a melting range from 217 to 221° C. The outer layer has a thickness of 35 μm and is composed of the polymer blend used as the outer layer in Example 1.

EXAMPLE 4

A two-layer tubular film is prepared by coextrusion. The inner layer has a thickness of 25 μm and is composed of a polyamide 12 having a viscosity of 250 ml/g and a melting range from 176 to 180° C. The outer layer has a thickness of 25 μm and is composed of the polymer blend used as the outer layer in Example 1.

EXAMPLE 5

A 40 μm thick tubular film is prepared, which is composed of a polymer blend of 70 percent by weight of the polyethylene mentioned in Example 1 and 30 percent by weight of the polyamide 6 mentioned in Example 1. After this tubular film has left the annular slot die, the polymer blend used as the outer layer in Example 1 is melt laminated to it, and for this purpose a second, concentrically arranged annular slot die is used. The outer layer has a thickness of 40 μm.

EXAMPLE 6

A two-layer tubular film is prepared by coextrusion. The inner layer has a thickness of 40 μm and is composed of a polymer blend of 40 percent by weight of the polyethylene mentioned in Example 1 and 60 percent by weight of a polyamide 6 having a viscosity of 250 ml/g and a melting range from 217 to 221° C. The outer layer has a thickness of 40 μm and is composed of the polymer blend used as the outer layer in Example 1.

EXAMPLE 7

A two-layer tubular film is prepared by coextrusion. The inner layer has a thickness of 40 μm and is composed of a polymer blend of 50 percent by weight of a polypropylene having a density of 0.9 and 50 percent by weight of a polyamide 6 having a viscosity of 320 ml/g and a melting range from 217° to 221° C. The outer layer has a thickness of 40 μm and is composed of the polymer blend used as the outer layer in Example 1.

EXAMPLE 8

A two-layer tubular film is prepared by coextrusion. The inner layer has a thickness of 35 μm and is composed of a polymer blend of 42 percent by weight of the polyethylene specified in Example 1 and 58 percent by weight of a copolyamide 6/6,6 having a viscosity of 240 ml/g and a melting range from 214° to 217° C. The outer layer has a thckness of 40 μm and is composed of the polymer blend used as the outer layer in Example 1.

EXAMPLE 9

A two-layer tubular film is prepared by coextrusion. The inner layer has a thickness of 30 μm and is composed of a polymer blend containing equal percentages by weight of the polyethylene and the polyamide specified in Example 1 and of a polyamide 12 having a viscosity of 250 ml/g and a melting range from 176° to 180° C. The outer layer has a thickness of 30 μm and is composed of the polymer blend used as the outer layer in Example 1.

EXAMPLE 10

A two-layer tubular film is prepared by coextrusion. The inner layer has a thickness of 40 μm and is composed of a polymer blend of 40 percent by weight of the polyethylene specified in Example 1 and 60 percent by weight of the polyamide 6 mentioned in Example 1. The outer layer has a thickness of 40 μm and is composed of a polymer blend of 90 percent by weight of the polyamide 6 of Example 1 and 10 percent by weight of the polyvinyl alcohol of Example 1.

EXAMPLE 11

A two-layer tubular film is prepared by coextrusion. The inner layer has a thickness of 40 μm and is composed of the polymer blend of Example 10. The outer layer has a thickness of 40 μm and is composed of 90 percent by weight of the polyamide 6 specified in Example 1 and 10 percent by weight of a polyvinyl alcohol having a viscosity of $2 \times 10^{-2}$ Pa.s and a degree of hydrolysis of 98 percent.

EXAMPLE 12

A two-layer tubular film is prepared by coextrusion. The inner layer has a thickness of 35 μm and is composed of the polymer blend of Example 10. The outer layer also has a thickness of 35 μm and is composed of a polymer blend of 96 percent by weight of the polyamide 6 specified in Example 1 and 4 percent by weight of the polyvinyl alcohol mentioned in Example 1.

EXAMPLE 13

A two-layer tubular film is prepared by coextrusion. The inner layer has a thickness of 40 μm and is composed of the polymer blend of Example 10. The outer layer has a thickness of 40 μm and is composed of a polymer blend of 99 percent by weight of the polyamide 6 specified in Example 1 and 1 percent by weight of the polyvinyl alcohol of Example 1.

EXAMPLE 14

A two-layer tubular film is prepared by coextrusion. The inner layer has a thickness of 15 μm and is composed of the polyethylene specified in Example 1, and the outer layer (thickness 25 μm) is composed of the polymer blend used as the inner layer in Example 10. After the coextruded tubular film has left the die, a third layer (thickness 35 μm) is applied by means of a concentrically arranged die, which third layer is made up of the polymer blend used as the outer layer in Example 1. The innermost layer of this three-layer tube, which consists of polyethylene, produces an extremely good heat-sealability.

The viscosity measurements for the products mentioned in the examples are carried out according to DIN No. 53729 in the case of polyamide 12, and according to DIN No. 53727 in the case of polyamide 6 and polyamide 6/6,6. The polyvinyl alcohol is measured as a 4 percent strength aqueous solution according to DIN No. 53015.

The polymer blends are prepared using the appropriate known plastification equipment, such as disc compressors or, preferably, single or multiple screw extruders.

The adhesion values and the values for the permeation of oxygen and water vapor are listed in the table which follows. These values show the good barrier properties of the tubes according to the present invention in comparison to prior art films.

The tubular films prepared according to Examples 1 to 13 are used for the production of sausages treated in hot water. The table also indicates the fit of the sausage casings, i.e., their appearance following cooling.

TABLE

| Example | Adhesion (N/15 mm) | Permeation calculated for a total thickness of 40 μm | | Appearance of the sausages following cooling |
|---|---|---|---|---|
| | | $H_2O$ (g/m$^2$ . d) | $O_2$ (cm$^3$/m$^2$ . bar . d) | |
| 1 | 2.8 | 3 | 15 | +++ |
| 2 | 2.8 | 5 | 18 | +++ |
| 3 | 2.0 | 4 | 15 | +++ |
| 4 | 1.0 | 12 | 18 | + |
| 5 | 1.0 | 3 | 12 | ++ |
| 6 | 3.0 | 6 | 12 | +++ |
| 7 | 2.0 | 3 | 12 | +++ |
| 8 | 2.5 | 3 | 12 | +++ |
| 9 | 2.0 | 10 | 15 | ++ |
| 10 | 2.5 | 5 | 11 | +++ |
| 11 | 1.5 | 5 | 16 | + |
| 12 | 2.8 | 5 | 11 | +++ |
| 13 | 2.8 | 5 | 16 | + |
| 14 | 1.0 | 1 | 12 | |

The permeation values are calculated for the same total film thickness (calculated thickness) to obtain absolutely comparable values.
The adhesion values are determined according to the so-called T-Peel Method which is described in "Adhesive Age", Sept. 1972, page 21.
+ Satisfactory
++ Good
+++ Very Good

What is claimed is:

1. A multi-layer tubular packaging material having two or more layers, comprising a tubular packaging arrangement comprised of a packaging material comprising at least one first layer of a polymer comprising a linear polyamide and, bonded to the outer surface of said first layer, at least one second layer of a polymer comprising a major proportion of a linear polyamide containing from about 2 to 40 percent by weight of a hydrophilic substance compatible with the polyamide, said hydrophilic substance comprising polyvinyl alcohol.

2. A packaging material according to claim 1, wherein the polyvinyl alcohol is comprised of a partially saponified form including less than 15 percent of unsaponified ester groups.

3. A packaging material according to claim 1, the polyamide containing the hydrophilic substance comprises a polyamide having from 4 to 6 carbon atoms in each unit.

4. A packaging material according to claim 3, wherein the polyamide containing the hydrophilic substance comprises polyamide 6.

5. A packaging material according to claim 1, having a permeability to oxygen of less than about 25 cm$^3$/m$^2$.d. bar, at a calculated thickness of 40 μm.

6. A packaging material according to Claim 1, having a permeability to water vapor of less than about 25 g/m$^2$.d. bar, at a calculated thickness of 40 μm.

7. A packaging material according to claim 1, wherein the first polyamide layer comprises a polyamide having 9 to 12 carbon atoms in each unit.

8. A packaging material according to claim 7, wherein the polyamide of said first layer is comprised of polyamide 11 or polyamide 12.

9. A packaging material according to claim 1, wherein the first polyamide layer comprises a polymer blend of polyamide and polyethylene.

10. A packaging material according to claim 9, wherein said polymer blend comprises polyamide 6 and polyethylene.

11. A packaging material according to claim 10, wherein said polymer blend comprises polyamide 6 and a low-density polyethylene.

12. The packaging material according to claim 9, wherein the first polyamide layer comprises a polymer blend of two polyamides and polyethylene.

13. The packaging material according to claim 12, wherein said two polyamides in said blend comprise polyamide 6 and polyamide 6,6.

14. The packaging material according to claim 12, wherein said two polyamides in said blend comprise polyamide 6 and polyamide 12.

15. A packaging material according to claim 9, wherein said polymer blend comprises from about 25 to 75 percent by weight of polyamide and from about 75 to 25 percent by weight of polyethylene.

16. A packaging material according to claim 15, wherein said polymer blend comprises from about 40 to 60 percent by weight of polyamide and from about 60 to 40 percent by weight of polyethylene.

17. The packaging material according to claim 1, wherein the first polyamide layer comprises a polymer blend of polyamide and polypropylene.

18. A packaging material according to claim 1, comprising at least one additional third layer of a thermoplastic polymer containing no polyamide, wherein said third layer forms the inner most layer and is comprised of a heat-sealable material.

19. A packaging material according to claim 1, wherein said material is oriented in at least one direction.

20. A packaging material according to claim 1, wherein said material is heat set.

21. A packaging material according to claim 1, in the form of a sausage casing.

* * * * *